US012672045B2

(12) United States Patent
Lin et al.

(10) Patent No.: US 12,672,045 B2
(45) Date of Patent: Jun. 30, 2026

(54) METHOD OF PATH SELECTION IN PDCP LAYER TO SUPPORT MULTIPATH CONFIGURATION

(71) Applicant: MEDIATEK INC., Hsin-Chu (TW)

(72) Inventors: Guan-Yu Lin, Hsin-Chu (TW);
Chia-Hao Yu, Hsin-Chu (TW);
Chung-Yin Ho, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 294 days.

(21) Appl. No.: 18/230,617

(22) Filed: Aug. 4, 2023

(65) Prior Publication Data

US 2024/0064605 A1 Feb. 22, 2024

Related U.S. Application Data

(60) Provisional application No. 63/371,531, filed on Aug. 16, 2022, provisional application No. 63/398,513, filed on Aug. 16, 2022.

(51) Int. Cl.
*H04W 40/22* (2009.01)
*H04W 40/12* (2009.01)
*H04W 88/04* (2009.01)

(52) U.S. Cl.
CPC ........... *H04W 40/22* (2013.01); *H04W 40/12* (2013.01); *H04W 88/04* (2013.01)

(58) Field of Classification Search
CPC ..... H04W 40/22; H04W 40/12; H04W 40/02; H04W 40/04; H04W 40/24; H04W 40/34;
(Continued)

(56) References Cited

U.S. PATENT DOCUMENTS

| | | | | |
|---|---|---|---|---|
| 11,259,350 B1 * | 2/2022 | Pan | ...................... | H04W 88/04 |
| 2022/0132605 A1 * | 4/2022 | Pan | ...................... | H04W 40/22 |

(Continued)

FOREIGN PATENT DOCUMENTS

| | | |
|---|---|---|
| EP | 3972380 A1 | 9/2020 |
| WO | WO2021/045859 A1 | 4/2020 |

OTHER PUBLICATIONS

European Intellectual Property Office Action 23191615.6-1215., dated Dec. 20, 2023 (12 pages).
(Continued)

*Primary Examiner* — Man U Phan
(74) *Attorney, Agent, or Firm* — Helen Mao; Zheng Jin; Imperium Patent Works

(57) ABSTRACT

Methods are provided to support path selection for a remote UE configured with multipath in a UE-to-network relay. A direct path or an indirect path is set as the primary path. Side information of the indirect path is considered for path selection. A remote UE can select a suitable path by utilizing the side information for path selection to check whether an indirect path can fulfill the QoS requirement of arriving UL traffic. In a network-controlled path selection, the base station can request UE to send side information. The base station indicates the selected path or the change of primary path to the UE via explicit signaling. Each path is identified by a path ID. The path indication is in a granularity of per radio bearer, per QoS flow, per logical channel, or per logical channel group.

14 Claims, 6 Drawing Sheets

(58) Field of Classification Search
CPC ..... H04W 76/14; H04W 76/15; H04W 76/19;
H04W 76/27; H04W 76/34; H04W 28/02;
H04W 28/08; H04W 28/09; H04W 88/04;
H04W 45/24; H04L 45/30; H04L 1/08
USPC ........................................................ 370/315
See application file for complete search history.

(56)                        References Cited

U.S. PATENT DOCUMENTS

| | | | | |
|---|---|---|---|---|
| 2022/0322202 | A1* | 10/2022 | Li | H04L 12/1407 |
| 2023/0199614 | A1* | 6/2023 | Wang | H04W 40/12 |
| | | | | 370/315 |
| 2023/0354152 | A1* | 11/2023 | Bangolae | H04W 40/22 |
| 2024/0056941 | A1* | 2/2024 | Tesanovic | H04W 40/12 |
| 2024/0147301 | A1* | 5/2024 | Kuo | H04W 28/0252 |
| 2024/0147302 | A1* | 5/2024 | Kuo | H04W 28/0278 |
| 2024/0373321 | A1* | 11/2024 | Chen | H04W 40/22 |
| 2025/0016655 | A1* | 1/2025 | Boubacar | H04W 40/12 |
| 2025/0184861 | A1* | 6/2025 | Sahyoun | H04W 8/005 |
| 2025/0203701 | A1* | 6/2025 | Lee | H04W 76/19 |
| 2025/0220484 | A1* | 7/2025 | Lee | H04W 24/10 |

OTHER PUBLICATIONS

Huawei: "Discussions on Rel-18 multi-path via SL relay and UE aggregation", 3GPP Draft; R2-2208488; 3rd Generation Partnership Project (3GPP), Mobile Compentence Center;Aug. 17, 2022-Aug. 29, 2022, XP052261795.

* cited by examiner

CONTROL PLANE PROTOCOL STACK

USER PLANE PROTOCOL STACK

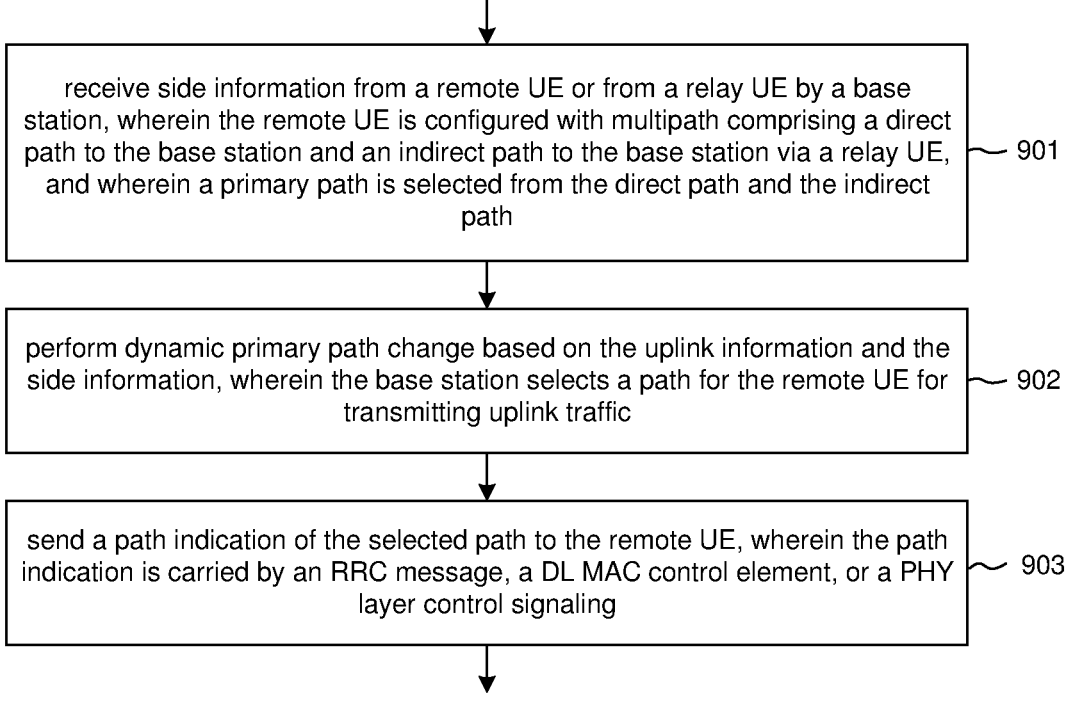

receive side information from a remote UE or from a relay UE by a base station, wherein the remote UE is configured with multipath comprising a direct path to the base station and an indirect path to the base station via a relay UE, and wherein a primary path is selected from the direct path and the indirect path ⟿ 901 perform dynamic primary path change based on the uplink information and the side information, wherein the base station selects a path for the remote UE for transmitting uplink traffic ⟿ 902 send a path indication of the selected path to the remote UE, wherein the path indication is carried by an RRC message, a DL MAC control element, or a PHY layer control signaling ⟿ 903

FIG. 9

METHOD OF PATH SELECTION IN PDCP LAYER TO SUPPORT MULTIPATH CONFIGURATION

CROSS REFERENCE TO RELATED APPLICATIONS

This application claims priority under 35 U.S.C. § 119 from U.S. Provisional Application No. 63/398,513, entitled "Method of path selection in PDCP layer to support multipath configuration", filed on Aug. 16, 2022; U.S. Provisional Application No. 63/371,531, entitled "Signaling of path indication to support multipath configuration", filed on Aug. 16, 2022. The disclosure of each of the foregoing documents is incorporated herein by reference.

TECHNICAL FIELD

The disclosed embodiments relate generally to wireless network communications, and, more particularly, to multipath configuration in 5G new radio (NR) wireless communications systems.

BACKGROUND

To extend network coverage, diverse relay technologies are developed. A relay node can be used to forward the packet/signal between the network node (e.g. the based station, the transmission and reception point (TRP)) and the use equipment (UE). The relay node can be network vendor deployed infrastructure, such as LTE Relay node, or NR IAB (integrated access backhaul) node specified since 3GPP Rel-16. The relay node can also be a user deployed relay, e.g., using a user equipment as relay (UE relay). This kind of relay node, compared to IAB, has a much more limited transmission/reception capability in forwarding traffic. However, its advantage is to support low-cost and dynamic/flexible deployment. Using a UE relay to extend network coverage is known as UE-to-NW relay. In 3GPP context, a relay UE uses sidelink (SL, different from uplink and downlink) resource to communicate with a remote UE (or source UE, who is the source of traffic to be forwarded). Therefore, in 3GPP, UE-to-NW relay is also known as SL relay.

To support sidelink relay, there are two kinds of UE-to-Network Relay architecture, i.e. Layer 2 relay (L2 relay) and Layer 3 relay (L3 relay). L3 based Sidelink Relay UE forwards data packet flow of the Remote UE as IP traffic as a general Router in data communication network. The IP traffic based forwarding is conducted in a best efforts way. For L3 UE-to-Network Relay, there exist both SLRBs over PC5 and Uu Radio Bearers to carry the QoS flows established between Remote UE and 5GC. L3 UE-to-Network Relay can support flow based mapping at SDAP layer when converting PC5 flow to Uu Flow, or vice versa, during traffic forwarding. Note that since L3 based Sidelink Relay UE works like an IP router, remote UE is transparent to the base station, i.e., the base station cannot know whether the traffic transmitted by a relay UE originates from this relay UE itself, or originates from a remote UE but is forwarded by this relay UE.

In contrast, in case of L2 based SL Relay, relaying is performed above RLC sublayer via Relay UE for both CP and UP between Remote UE and network. Uu SDAP/PDCP and RRC are terminated between Remote UE and gNB, while RLC, MAC and PHY are terminated in each link (i.e. the link between Remote UE and UE-to-Network Relay UE and the link between UE-to-Network Relay UE and the gNB). Unlike in L3 relay, in L2 relay the base station is aware of each remote UE, and thus before the relay UE starts to forward normal data traffic, the end-to-end connection between a remote UE and the base station should be established first. After establishing the RRC connection via SL relay, the remote UE can then forward data traffic based on the established bearers and the forwarding/router information carried in adaptation layer.

Traditionally, in 3GPP R17, only single path UE-to-NW relay is supported. That is, a UE can select either a direct path (i.e. directly connect to a gNB via Uu link) or an indirect path (i.e. connect to the gNB via traffic forwarding of a relay UE), but not both. Besides, 3GPP R17 only support single-hop UE-to-NW relay. Multi-hop relay, however, can help to eliminate deep coverage holes. On the other hand, multi-path relay allows multiple traffic forwarding paths from the source to destination, which definitely increase the transmission reliability and may be also beneficial to remote UE throughput. Accordingly, a method of further extending the UE-to-NW relay involving multi-hop and multi-path is desired.

SUMMARY

In one novel aspect, methods are provided to support path selection for a remote UE configured with multipath in a UE-to-network relay. A direct path or an indirect path is set as the primary path (e.g., associated with a primary RLC entity). In one embodiment, the primary path is set as the direct path by default, and is always selected to transmit signaling radio bearer (SRB) traffic, PDCP control PDU, and URLLC traffic. Besides, the primary path may be always selected to transmit data of data radio bearers with a logical channel priority above a priority threshold. Side information of the indirect path is considered for path selection. A remote UE can select a suitable path by utilizing the side information for path selection to check whether an indirect path can fulfill the QoS requirement of arriving UL traffic. The remote UE can trigger measuring round-trip latency for an indirect path in PDCP level or a higher layer level.

In another novel aspect, methods are provided to support transmission of path indication from the network to a remote UE to indicate which path should be applied to transmit data. In one embodiment, the message for path indication is carried by an RRC message, a MAC CE, or a physical layer control signaling. The path indication is in a granularity of per radio bearer, per QoS flow, per logical channel, or per logical channel group. The path indication message uses an implicit or explicit path ID to identify a path. The direct path may have a default path ID. The path ID is assigned by the network and is locally distinct for each remote UE. In one embodiment, the network selects or updates the path of a radio bearer by updating the primary or default RLC entity. A remote UE or its serving relay UE reports side information for path selection when side information related measurement events occur or when requested by the network.

Other embodiments and advantages are described in the detailed description below. This summary does not purport to define the invention. The invention is defined by the claims.

BRIEF DESCRIPTION OF THE DRAWINGS

FIG. 9 is a flow chart of a method of network controlled path selection for UE-to-network relay in accordance with one novel aspect.

DETAILED DESCRIPTION

Reference will now be made in detail to some embodiments of the invention, examples of which are illustrated in the accompanying drawings.

Figure 1:
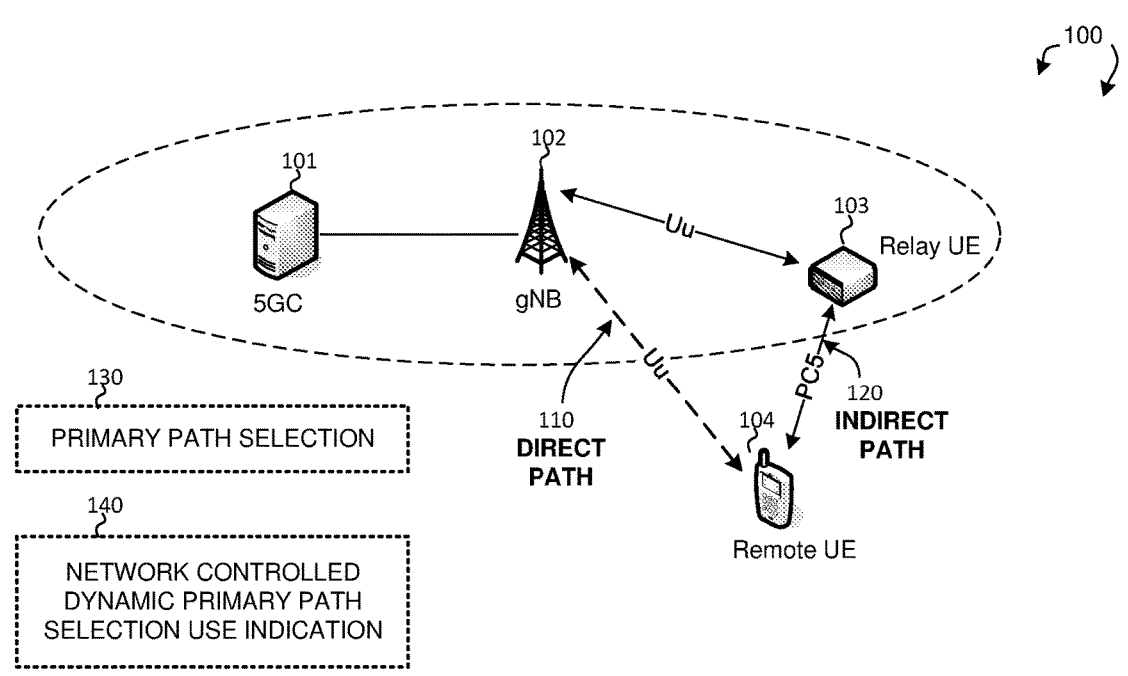
FIG. 1 illustrates a wireless cellular communications system supporting UE-to-network relay with network controlled path selection for uplink transmission in accordance with a novel aspect.

FIG. 1 illustrates a wireless cellular communications system 100 supporting UE-to-network relay with network controlled path selection for uplink transmission in accordance with a novel aspect. 5G new radio (NR) mobile communication network 100 comprises a 5G core (5GC) 101, a base station gNodeB (gNB) 102, and a plurality of user equipments including UE 103 and UE 104. For in-coverage UEs, a base station can schedule data traffic over Uu link. For out-of-coverage UEs, a relay UE can schedule data traffic over PC5 (or sidelink). In FIG. 1, UE 103 is a radio resource control (RRC)-connected UE that acts as a mobile device relay using PC5 (or sidelink) to relay data traffic to/from end remote UEs for coverage extension. Remote UE 104 is not directly connected to the network. Relay UE 103 helps to relay all data traffic for remote UE 104. Relay UE 103 operates to relay communications between UE 104 and the network, thus allowing the network to effectively extend its coverage to the remote UEs.

Traditionally, in 3GPP R17, only single path UE-to-NW relay is supported. That is, a UE can select either a direct path (i.e. directly connect to a gNB via Uu link) or an indirect path (i.e. connect to the gNB via traffic forwarding of a relay UE), but not both. Besides, 3GPP R17 only support single-hop UE-to-NW relay. Multi-hop relay, however, can help to eliminate deep coverage holes. On the other hand, multi-path relay allows multiple traffic forwarding paths from the source to destination, which definitely increase the transmission reliability and may be also beneficial to remote UE throughput. Accordingly, a method of further extending the UE-to-NW relay involving multi-hop and multi-path is desired.

In multipath relay, a remote device may be provided with multiple paths for communicating with a destination entity. The destination entity may be a network node such as gNB or gNB-CU. The mentioned paths may include at least one direct path between the remote device and the destination node. The paths may include at least one indirect path between the remote device and the destination node. An indirect path may include at least one relay device between the remote device and the destination node. A remote device may be indicated (or select) to communicate with the destination node via at least one path from the multiple paths. In the example of FIG. 1, remote UE 104 is provided with a direct path 110 (Uu interface) between UE 104 and gNB 102, and an indirect path 120 between UE 104 and relay UE 103 (sidelink, WiFi, or other UE-to-UE communication techniques), and between relay UE 103 and gNB 102 (Uu interface).

In one novel aspect (130), a method is provided to support path selection for a remote UE configured with multipath in a UE-to-network relay. A direct path or an indirect path is set as the primary path (associated with a primary RLC entity). In one embodiment, the primary path (i.e., the path associated with the primary RLC entity) is set as the direct path by default, and is always selected to transmit signal radio bearer (SRB) traffic, PDCP control PDU, and URLLC traffic. Side information of the indirect path is considered for path selection. A remote UE can select a suitable path by utilizing the side information for path selection to check whether an indirect path can fulfill the QoS requirement of arriving UL traffic. The remote UE can trigger measuring round-trip latency for an indirect path in PDCP level or a higher layer level.

In another novel aspect (140), methods are provided to support transmission of path indication from the network to a remote UE to indicate which path should be applied to transmit data. In one embodiment, the message for path indication is carried by an RRC message, a MAC CE, or a physical layer control signaling. The path indication is in a granularity of per radio bearer, per QoS flow, per logical channel, per logical channel group, or per UE. Besides, a path indication may be specific to data with priority above or below a threshold. The path indication message may use an implicit or explicit path ID to identify a path. The direct path may have a default path ID, e.g., 0. The path ID is assigned by the network and is locally distinct for each remote UE. If a remote UE has one direct path and only one indirect path, the network may instead use other indicator (e.g., a Boolean value or a flag) to indicate whether the mentioned path is or is not the default path. Another alternative is that if a remote UE has one direct path and only one indirect path, the network may instead use path switch notification to instruct UE to switch the selected path from direct/indirect path to indirect/direct path. In one embodiment, the network selects or updates the path of a radio bearer by updating the primary or default RLC entity. A remote UE or its serving relay UE reports side information for path selection to the network, for example, when side information related measurement events occur or when the remote UE receives request from the network for the side information related measurement results. In one embodiment, the path indication sent by the network may indicate one or multiple paths the UE can or cannot apply for UL transmission. For example, if both the direct and the indirect path are in good conditions (e.g., the indirect path recovers from bad condition), the network may send an indication, allowing UE to apply either path for UL transmission.

Figure 2:
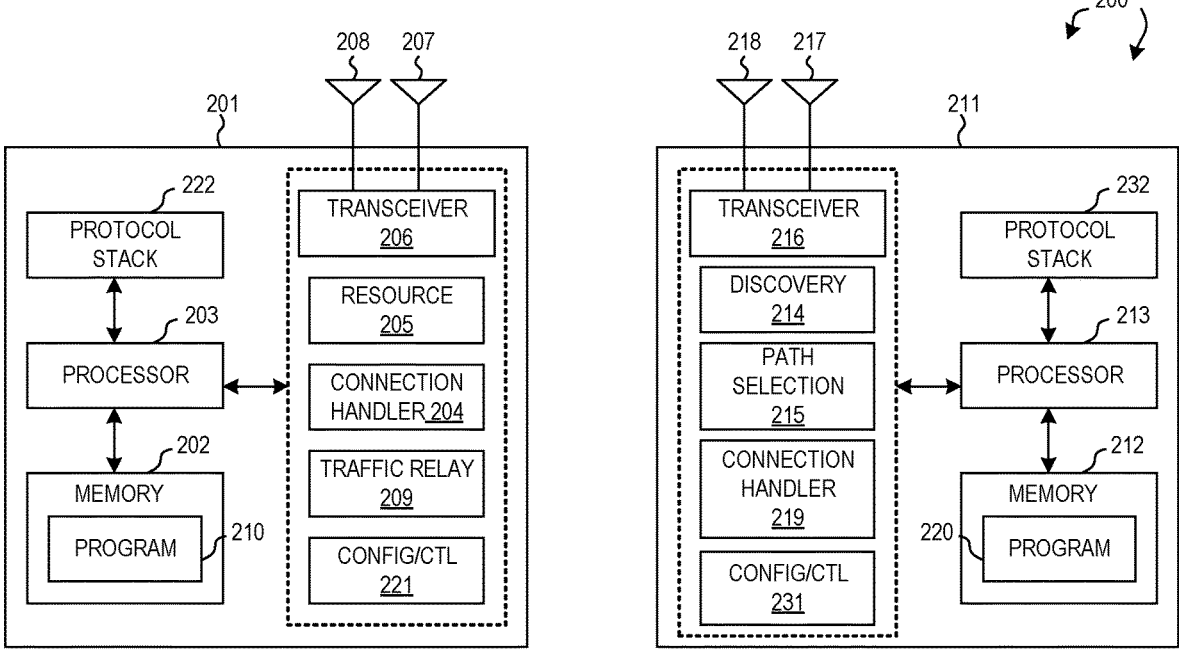
FIG. 2 is a simplified block diagram of a wireless transmitting device and a receiving device in accordance with embodiments of the current invention.

FIG. 2 is a simplified block diagram of wireless devices 201 and 211 in accordance with a novel aspect. For wireless device 201 (e.g., a relay UE), antennae 207 and 208 transmit and receive radio signals. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a remote UE), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a relay UE that includes a protocol stack 222, a resource management circuit 205 for allocating and scheduling sidelink resources, a connection handling circuit 204 for establishing and managing connections, a traffic relay handling controller 209 for selecting and relaying all or part of control signaling and/or data traffic for remote UEs, and a control and configuration circuit 221 for providing control and configuration information. Wireless device 211 is a remote UE that includes a protocol stack 232, a relay discovery circuit 214 for discovering relay UEs, a path selection handling circuit 215 for selecting a path for traffic transmission, a connection handling circuit 219 for establishing and managing connections, a path selection circuit for selecting path under multipath configuration, and a configuration and control circuit 231. The different functional modules and circuits can be implemented and configured by software, firmware, hardware, and any combination thereof. The function modules and circuits, when executed by the processors 203 and 213 (e.g., via executing program codes 210 and 220), allow relay UE 201 and remote UE 211 to perform embodiments of the present invention accordingly.

Figure 3A:
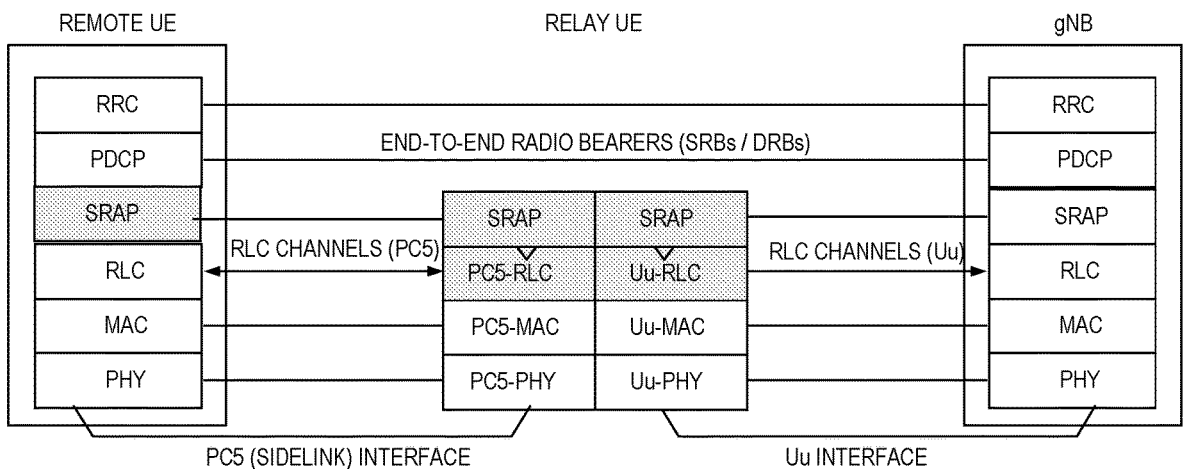
FIG. 3A illustrates control plane protocol stacks for a layer 2 (L2) relaying architecture for UE-to-network relay in accordance with one novel aspect.
Figure 3B:
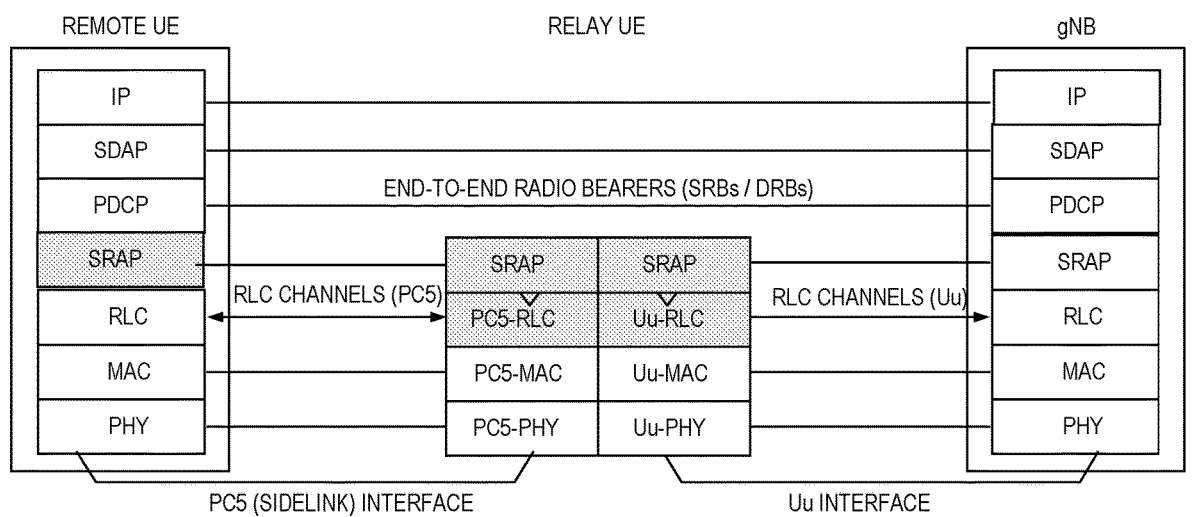
FIG. 3B illustrates user plane protocol stacks for a layer 2 (L2) relaying architecture for UE-to-network relay in accordance with one novel aspect.

FIGS. 3A and 3B illustrate Control Plane and User Plane protocol stacks for a layer 2 (L2) relaying architecture for UE-to-network relay in accordance with one novel aspect. The relaying operation may occur at a Radio Link Control (RLC) sublayer of L2. Alternatively, the relaying operation may occur at an adaptation sublayer added between the RLC and a packet data convergence protocol (PDCP) sublayer of L2, e.g., a Sidelink Relay Adaptation Protocol (SRAP). The lower layers of the protocol stack, including a physical (PHY) layer, a medium access control (MAC) layer, and the RLC layer, are terminated between the relay UE and each remote UE, with service data units (SDUs) of the RLC protocol relayed between the two links at the relay UE. The upper layers of the protocol stack, including the PDCP layer, a service data adaptation protocol (SDAP) layer in the case of user plane (UP) operation, and upper layers that may comprise a radio resource control (RRC) protocol, are terminated end-to-end between remote UE and the network. This protocol stack is applicable to both control and user plane operation, with different upper-layer protocols for the two cases. In particular, the protocol stack allows for control and management of a RRC connection between the remote UE and the network, using the relay UE as a communications intermediary but without any involvement of the relay UE in the actual protocol operations for connection control. For example, remote UE may send RRC messages to the network (and vice versa) to configure aspects of a RRC connection, such as the configuration of the protocol stack, the configuration of radio bearers, and so on. Such RRC messages may be forwarded transparently by the relay UE.

Figure 4:
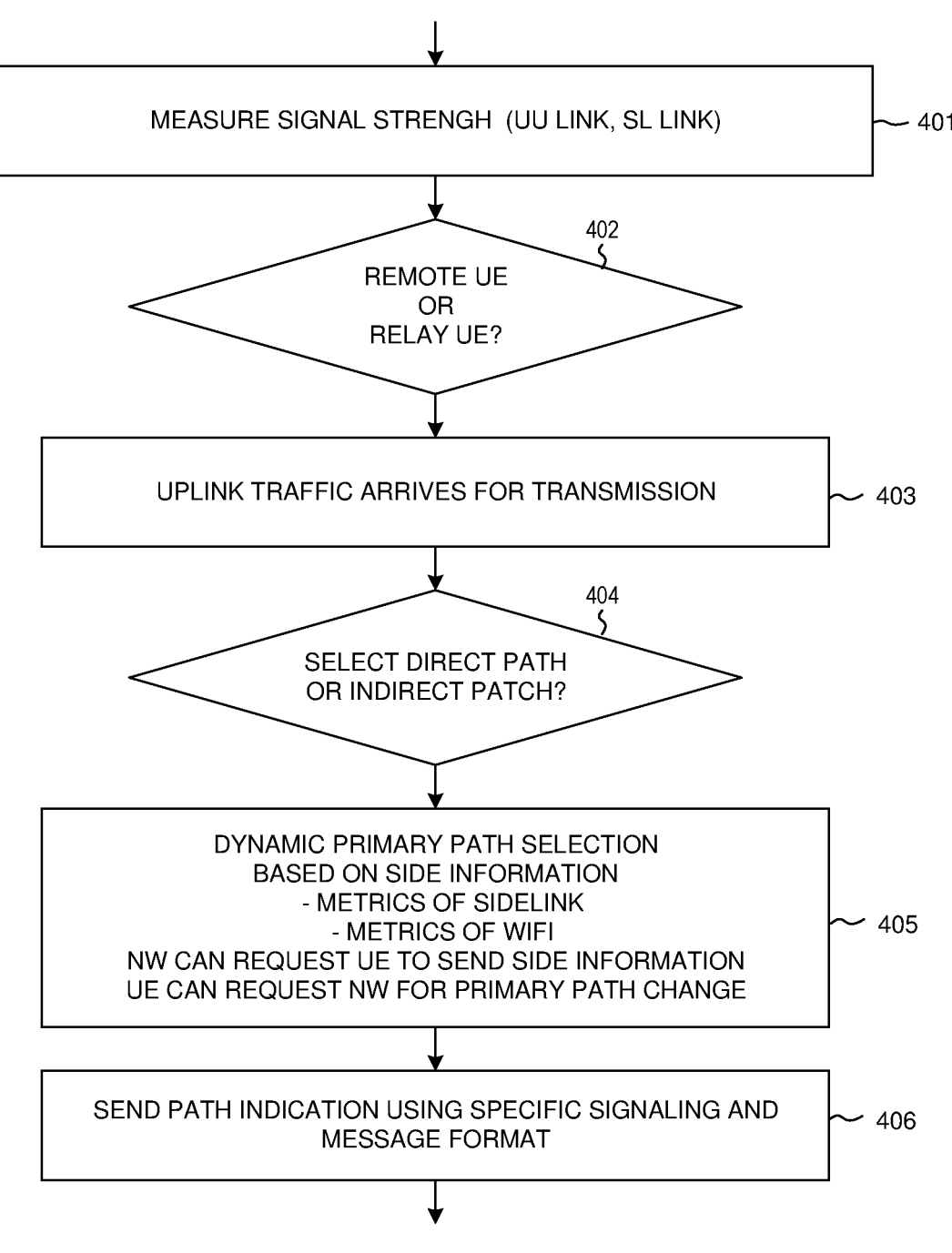
FIG. 4 illustrates a simplified flow of path selection for UE with multipath configuration in a UE-to-network relay.

FIG. 4 illustrates a simplified flow of path selection for UE with multipath configuration in a UE-to-network relay. In step 401, a UE measures signal strength and quality of the Uu link, side link, or WiFi link. To extend network coverage, there are RSRP (received signal strength) criteria to determine whether a UE can serve as a relay UE or a remote UE. It is specified that a remote UE should have the measured Uu RSRP below a RSRP threshold (threshHighRemote). This means a UE can request for help traffic forwarding only when the UE has a very bad Uu RSRP. Besides, a UE can serve as a relay UE only when its Uu RSRP is above a RSRP threshold (threshLowRelay). This means a UE can help other UE to forward traffic only when the UE has good Uu link quality. In addition, a UE can be a relay UE only when its Uu RSRP is below another RSRP threshold (known as threshHighRelay), which is used to prevent cell-center UE from being a relay. Otherwise, if a relay UE is in very cell center, and a remote UE is in cell edge, the remote UE would transmit with a very large power to communicate with the cell center UE and thus cause much interference to its neighboring UE. Finally, there is a sidelink RSRP threshold (sl-RSRP-Thresh) used to measure the sidelink quality between the remote UE and the relay UE. If the SL RSRP is below the threshold, the sidelink towards the relay is considered too bad to support satisfactory relay performance. In step 402, the UE determines whether it is a relay UE or a remote UE accordingly.

In step 403, uplink traffic arrives for transmission. When an uplink packet arrives to the PDCP entity (i.e. as a PDCP PDU), a remote UE with multipath activated may decide which path is used to forward the packet, in step 404. For example, if the direct path is selected, the PDCP PDU is forwarded to the Uu RLC. On the other hand, if the indirect path is selected, the PDCP PDU is then forwarded to SRAP or SL RLC, and then transmitted to relay UE via sidelink.

In one embodiment, the primary path is set as the direct path by default, and is always selected to transmit SRB traffic, PDCP control PDU, and URLLC traffic. In one example, control signaling may always be forwarded to direct link for the reason of robustness. For example, a PDCP control PDU is always forwarded to an RLC entity associated with the direct Uu link. For example, if the PDCP entity is associated with SRB (signaling radio bearer), a PDCP entity always forwards traffic to the RLC entity associated with the direct Uu link. In another example, latency-sensitive data may always be forwarded to direct link for a shorter latency. For example, a PDCP entity associated with a DRB (data radio bearer) whose QoS flow has latency requirement (e.g. packet delay budget, PDB) below a latency threshold always forwards traffic to a RLC entity associated with the direct Uu link.

In one embodiment, a primary path can be configured with different granularity, per UE, per logical channel or logical channel group (LCH/LCG), per signal radio bearer or data radio bearer (SRB/DRB), per QoS flow, etc. A radio bearer that can be transmitted on both paths is called "split bearer". A radio bearer that can be transmitted only on a specific path is called "non-split bearer". For example, the granularity for path selection in the PDCP entity when multipath is configured, could be per radio bearer or per QoS flow associated with the PDCP entity. Traffic forwarding is then based on each granularity (e.g., each radio bearer). If the UL traffic volume is below a threshold, UE forwards traffic only to the primary path. Otherwise, UE forwards UL traffic on either the direct path or the indirect path.

In one novel aspect, in step 405, side information of indirect path can be used to perform dynamic primary path selection, i.e. select one path from the configured or activated multiple paths. It could be the gNB or the remote/relay UE to perform the path selection based on the side information. Metrics of sidelink includes SL RSRP, SL SINR, SL channel busy ratio (CBR), or transmission latency of the indirect path from the remote UE to the gNB via the relay UE. Metrics of WiFi link between remote UE and relay UE can also be used. The network can request UE to send side information, and UE can also request the network to perform dynamic primary path change.

In one embodiment, a remote UE can derive the round-trip latency and end-to-end achievable throughput for each indirect path based on side information or based on inference from side information. Using the two information the remote UE may derive the latency required to complete transmission of traffic in the buffer. Accordingly, the remote UE select a path which can satisfy the requirement on data rate and latency.

In one embodiment, if a remote UE receives a congestion notification to indicate congestion/overload for a relay UE or for an indirect path, the remote UE could consider the indirect path corresponding to the relay UE as congested or barred, and avoid selecting the indirect path for uplink data transmission. To be specific, when receiving a congestion notification from the relay UE, the remote UE may configure or make RLC entities corresponding to the congested path as not available, so that a PDCP entity would not select a congested path for uplink data transmission.

In one embodiment, side information for path selection includes link quality of individual paths. For a direct path, this may refer to remote device Uu quality. For an indirect path, this may refer to remote-relay quality (sidelink, SL) and/or relay device Uu quality. In one example, an aggregated link quality is derived based on SL quality and/or Uu quality. Link quality may refer to RSRP, RSRQ, SINR, scheduled modulation and coding scheme (MCS) level, CSI reporting content (e.g., including suitable number or rank/ layers to be applied), HARQ state statistics of individual link.

In one embodiment, side information for path selection includes path loading information. For a direct path, loading may refer to remote device Uu interface average/current throughput, average/current packet delay, average/current traffic in buffer etc. For an indirect path, loading may refer to average/current/required throughput, average/current packet delay in buffer, average/current traffic in buffer, for SL of the indirect path, or for relay device Uu of the indirect path. In one example, an aggregated loading information is derived based on SL and Uu of the indirect path. In one example, the number of serving remote UEs of the relay device may be further considered. In one example, the number of serving remote UEs of higher QoS/priority level than the concerned remote UE may be considered.

In one embodiment, side information for path selection includes requirement of traffic. This may refer to remote device QoS requirement of its traffic (in buffer or foreseeable packets). For example, if QoS requirement is high, the remote device traffic may be given higher priority in relay(s) on an indirect path when competing with other remote devices sharing the same relay(s). For an indirect path, this may further refer to relay device traffic QoS requirements of the relay device and/or other remote device(s) sharing the same relay(s).

In one embodiment, side information for path selection includes battery status of relay and/or remote UE. For example, if remote UE is with low battery, indirect path(s) may be preferred over direct path. For example, if relay UE is with low battery status, the corresponding indirect path may not be preferred.

In one embodiment, side information for path selection includes Relay UE capability of an indirect path. The mentioned relay UE capability may include one of number of TX/RX antenna for UL/SL, number of supported UL/SL layers, number of supported UL/SL bandwidth, number of supported UL/SL carriers, and supported maximum transmission power.

In one embodiment, side information for path selection includes round-trip latency between remote UE and gNB via the Relay UE of an indirect path. For an indirect path, the L2 relay UE indeed takes time to decode and forward. The processing time, which may only be a few milliseconds, may impact significantly to latency-critical service. To measure the round-trip latency, the remote UE can transmit ping like message to the gNB via the indirect path. Upon receiving the ping message, the gNB reply with a response to record the latency. The latency can be measured as a complete round trip, or be measured for UL and DL parts separately. The measurement can be performed in AS level, e.g. PDCP like L2 UE-to-Network packets, or could be performed in higher layer level.

In step 406, The network can use explicit signaling to indicate the suitable path for all traffic of the UE or for specific traffic of an LCH/LCH priority/LCG/RB/PDCP control PDU, SRB/DRB, or QoS flow. The explicit signaling can be RRC message, MAC CE, or PHY layer downlink control information (DCI). The network can indicate a primary path as the default path for UL transmission. The primary path is by default the direct path, and can be reconfigured by the base station. The primary path can be for all traffic, or for traffic of a specific LCH/LCH priority/LCG/ RB/PDCP control PDU/QoS flow.

Figure 5:
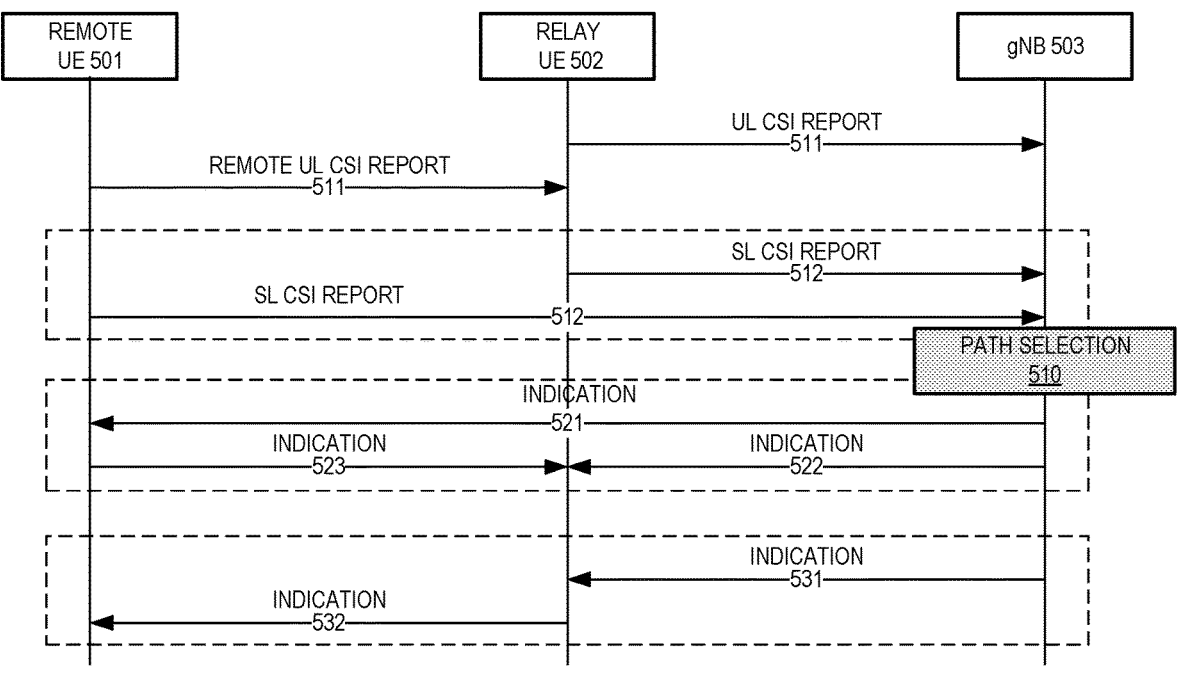
FIG. 5 illustrates a first embodiment of a UE-to-network relay for path selection by a gNB using indication in accordance with one novel aspect.

FIG. 5 illustrates a first embodiment of a UE-to-network relay for path selection by a gNB using indication in accordance with one novel aspect. The signaling flow to transmit side information for relay selection and/or path selection depends on who determine the selected path, i.e. it could be the gNB, the relay UE, or the remote UE to select the path for data transmission. In the embodiment of FIG. 5, it is the destination node (gNB) to perform path selection. In step 511, remote UE 501 and/or relay UE 502 provide uplink status (e.g. UL CSI report) to gNB 503. In step 512, remote UE 501 and/or relay UE 502 provide sidelink status (e.g. SL CSI report) to gNB 503. In step 520, gNB 503 determines the path. To inform relay and/or remote UE of the selected path, gNB 503 can indicate the selected path to remote UE via remote UL (521). Optionally, gNB 503 also send indication to relay UE via relay UL (522), or remote UE send indication to relay UE via SL after informed by gNB (523). Another alternative is that gNB 503 indicates the selected path to relay UE (531), and then relay UE sends indication to remote UE (532).

In one embodiment, if path is selected by the gNB, the gNB can configure relay UE and/or remote UE to report specific side information periodically. In one embodiment, if path is selected by the gNB, the gNB can transmit request message to relay UE and/or remote UE, who then provide their own side information as requested. Path selection may be performed implicitly. For example, NW can re-configure the default RLC entity or primary RLC entity for a PDCP entity associated with multipath paths.

In one embodiment, gNB can help to pair relay and remote, which is a potential use case for multipath. For example, a relay UE reports the side information for relay selection to the gNB. A remote UE, in case it is RRC_CO-NNECTED, can report its requirement on side information (and possibly its location) to the gNB, and the gNB then provides the potential candidate relay list to the remote UE. The remote UE can then check whether any candidate relay in the list is nearby (e.g. with a strong enough SL-RSRP or SD-RSRP).

In another example, an RRC_CONNECTED remote UE, if it wants to find a suitable relay, reports its requirement for side information to the gNB. The gNB can then send a message to trigger some candidate UEs (e.g. locates nearby the remote UE and/or meet the side info requirement) to transmit discovery message, searching for the remote UE on demand.

Figure 6:
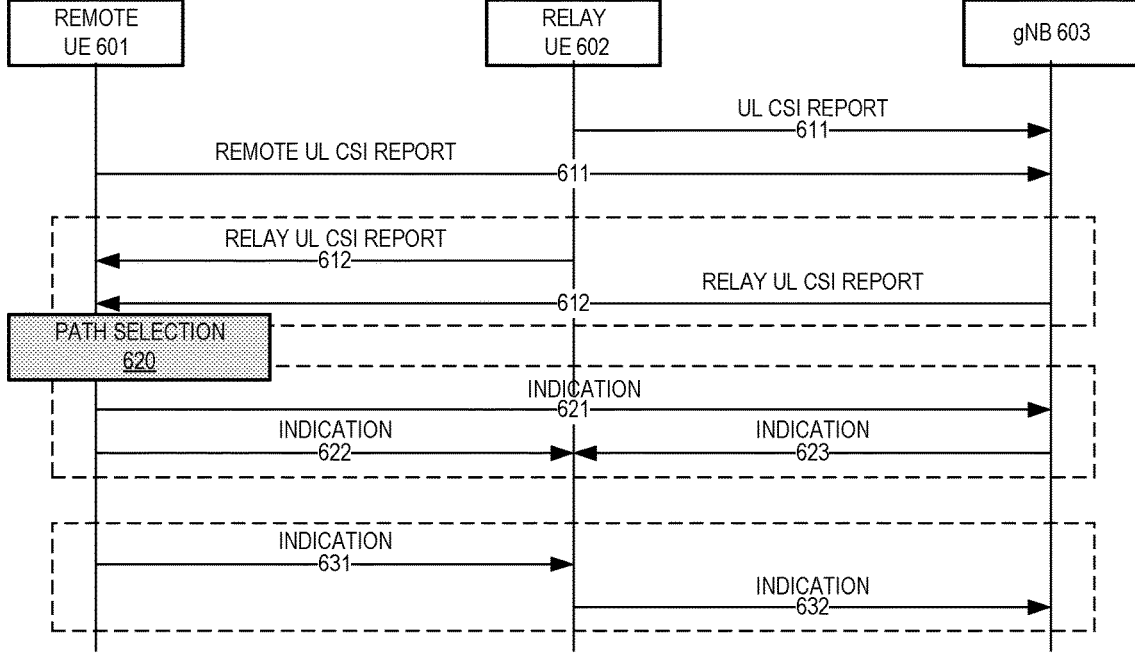
FIG. 6 illustrates a second embodiment of a UE-to-network relay for path selection by a remote UE using indication in accordance with one novel aspect.

FIG. 6 illustrates a second embodiment of a UE-to-network relay for path selection by a remote UE using indication in accordance with one novel aspect. In the embodiment of FIG. 6, it is the remote UE to perform path selection. In this embodiment, remote UE may need the Uu information of the relay UE to determine whether indirect path has advantage over direct path. In step 611, remote UE 601 and/or relay UE 602 provides uplink status (e.g. UL CSI report like message) to gNB 603. In step 612, remote UE 602 acquires the UL status (e.g. CSI report) of relay UE via relay node directly through SL or via gNB through Uu interface. In step 620, remote UE 601 determines the applied path. Remote UE 601 then indicate the selected path to gNB 603 via remote UL (621). Optionally, remote UE 601 also sends indication to relay UE 602 via SL (622), or gNB 603 send indication to relay UE 602 after receiving indication from remote UE (623). Another alternative can be that remote UE 601 indicates the selected path to relay UE 602 (631), and then relay UE 602 sends indication to gNB 603 (632).

In one embodiment, if path is selected by remote UE, the remote UE can configure report configuration with the relay UE (e.g. via RRCReconfigurationSidelink), wherein the report configuration may specify the side information and periodicity to report. In one embodiment, if path is selected by remote UE, the remote UE can transmit a request (e.g. via a SL RRC message or SL MAC CE or SL SCI) to the relay UE, asking for the side information such as a relay buffer status or a supportable Uu data rate. As a response, the relay UE provides the requested side information.

Figures 7, 8:
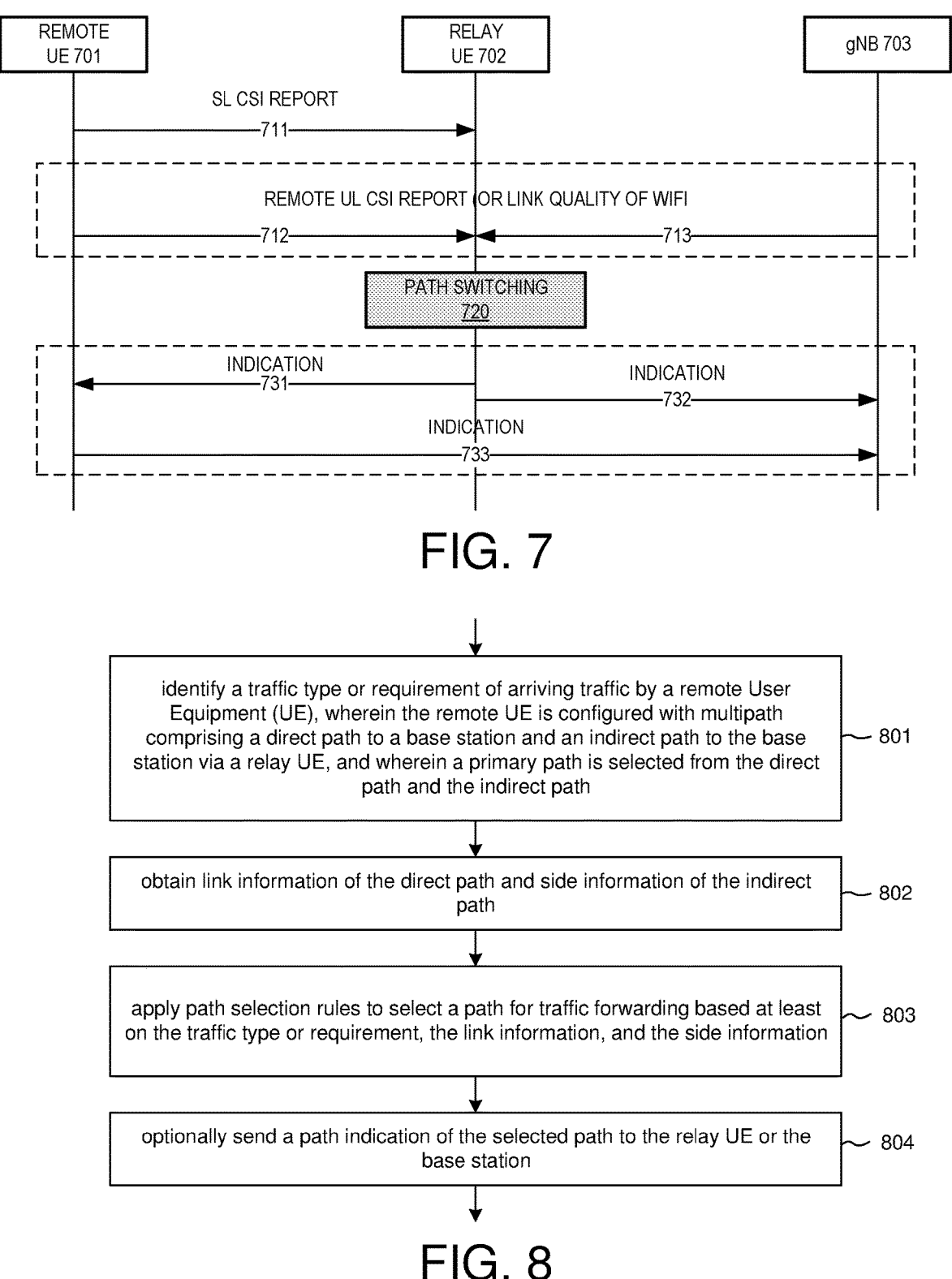
FIG. 7 illustrates a third embodiment of a UE-to-network relay for path selection by a relay UE using indication in accordance with one novel aspect.
FIG. 8 is a flow chart of a method of path selection performed by a remote UE for UE-to-network relay in accordance with one novel aspect.

FIG. 7 illustrates a third embodiment of a UE-to-network relay for path selection by a relay UE using indication in accordance with one novel aspect. In the embodiment of FIG. 7, it is the relay UE to trigger the path switching. In step 711, remote UE 701 sends SL CSI report to relay UE 702. In steps 712 and 713, remote UE or gNB transmit Remote CSI report to relay UE. The relay UE can then determine the applied path in step 720. Relay UE 702 then can indicate the selected path to remote UE via SL (731). Optionally, relay UE 702 can indicate the selected path to gNB 703 (732), or remote UE 701 can send the path indication from relay UE 702 to gNB 703 after receiving indication from relay UE 702 (733). In one example, path selection indication from a relay node may indicate selecting indirect path. For example, a resource scheduling SCI as path selection indication from a relay device may indicate selecting indirect path corresponding to the relay device.

In one embodiment, if a path is selected by the relay UE, the relay UE can configure report configuration with the remote UE (e.g. via RRCReconfigurationSidelink), wherein the report configuration may specify the side information and periodicity to report. In one embodiment, if path is selected by relay UE, the relay UE can send request to acquire the side information from the remote UE side, e.g., the Uu link condition of the remote UE.

As mentioned before, (part of) side information for path selection may also be used for relay selection. To be used for relay selection, the side information should be provided during relay discovery. In one embodiment, the side information for relay selection can be included in the discovery message. For example, a candidate relay can transmit/ broadcast side information in its discovery message, and a remote UE transmits discovery message as response if the side information provided by the candidate ready is suitable to the remote UE. In another example, a remote UE transmits its discovery message carrying its relay requirement (e.g. desired relay bandwidth), and those candidate relay UEs who meet the requirement sends discovery message as response.

From a transmission perspective, traffic (e.g. in the granularity of radio bearer, QoS flow, logical channel, or logical channel group) can be transmitted in one of path selection mode, duplication mode, and path aggregation mode. In path selection mode, a packet is transmitted on only the indicated/ selected path(s) among the configured or activated ones. In duplication mode, the same packet (e.g. PDCP PDU or RLC SDU) is transmitted on all the selected/activated multiple paths. In aggregation mode, a packet can be transmitted on any one of the activated multiple paths (path aggregation). The three modes can be indicated/configured by path indication message/signaling.

Each individual path may be identified by a distinguished path ID. In one embodiment, the direct link may have a default path ID (e.g. 0). In one embodiment, for a remote UE configured with a direct path and an indirect path, there are default path IDs for the two paths. For example, direct path is assigned with path ID 0, while indirect path is assigned with path ID 1 by default. In one embodiment, a path ID may be associated with remote device ID for, e.g., direct path. For example, part of path ID is derived from remote device ID. Remote device ID mentioned here may refer to (part of) its C-RNTI or 5G-S-TMSI. In one embodiment, a path ID may be (further) associated with relay device ID for, e.g., indirect path.

Remote device ID mentioned here may refer to (part of) its C-RNTI, 5G-S-TMSI, or local ID associated with the remote UE, which may be assigned by the network or the remote UE. Path ID may be implicitly or explicitly provided. For example, path ID may be implicitly recognizable based on the source of path selection indication.

Information pertinent to individual paths may be configured by RRC message. In one embodiment, if the path is selected/configured by the network, the network can use RRC message (e.g. RRCReconfiguration message) carrying path indication. In one example, the network can transmit RRC message carrying path indication to the remote UE directly. In one example, the network can transmit path indication by RRC message to the remote UE via the relay path. In one example, the network can transmit path indication by RRC message to the serving relay UE, and the serving relay UE then forwards the path indication by a sidelink RRCReconfiguration message. In one example, if a UE determines the path, an SL RRC message (e.g. RRCReconfigurationSidelink message) can be used to carry the path indication to inform remote/relay UE.

From signaling perspective, there are several ways to signal the path selection indication. Path selection indication may indicate the target traffic types (e.g. SRB/DRB, QoS flow, logical channel, or logical channel group) to apply the indication, and optionally the applied transmission mode (e.g. one of the path selection mode, duplication mode, and path aggregation mode as aforementioned.) Path selection indication may be carried by via MAC-CE signaling. In one embodiment, a MAC-CE signaling may indicate a subset of paths for communication. In one embodiment, a MAC-CE signaling may indicate one path for communication. In one embodiment, the indicated path(s) may be active until the next valid path selection indication is received.

In addition to MAC CE signaling, path selection indication may be indicated via PHY control channel. The PHY control channel may be a physical resource scheduling signaling. For example, a resource scheduling DCI as path selection indication may indicate selecting direct path. A PHY control channel indication may be further used for dynamically selecting a subset of path(s) from the MAC-CE indicated paths.

FIG. 8 is a flow chart of a method of path selection performed by a remote UE for UE-to-network relay in accordance with one novel aspect. In step 801, a UE identifies a traffic type or requirement of arriving traffic, wherein the remote UE is configured with multipath comprising a direct path to a base station and an indirect path to the base station via a relay UE, and wherein a primary path is selected from the direct path and the indirect path. In step 802, the remote UE obtains link information of the direct path and side information of the indirect path. In step 803, the remote UE applies path selection rules to select a path for traffic forwarding based at least on the traffic type or requirement, the link information, and the side information. In step 804, the remote UE optionally sends a path indication of the selected path to the relay UE or the base station.

FIG. 9 is a flow chart of a method of network controlled path selection for UE-to-network relay in accordance with one novel aspect. In step 901, a base station receives side information from a remote UE or from a relay UE, wherein the remote UE is configured with multipath comprising a direct path to the base station and an indirect path to the base station via a relay UE, and wherein a primary path is selected from the direct path and the indirect path. In step 902, the base station performs dynamic primary path change based on the uplink information and the side information, wherein the base station selects a path for the remote UE for transmitting uplink traffic. In step 903, the base station sends a path indication of the selected path to the remote UE, wherein the path indication is carried by an RRC message, a DL MAC control element, or a PHY layer control signaling.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   identifying a traffic type or requirement of arriving traffic by a remote User Equipment (UE), wherein the remote UE is configured with multipath comprising a direct path to a base station and an indirect path to the base station via a relay UE, and wherein a primary path is selected from the direct path and the indirect path;

obtaining, by the remote UE, link information of the direct path and side information of the indirect path, wherein the side information comprises metrics of sidelink (SL) or metrics of WiFi between the remote UE and the relay UE, and wherein the metrics of sidelink comprises one of a SL reference signal received power (RSRP), SL signal to interference and noise ratio (SINR), SL channel busy ratio (CBR), and a transmission latency; and applying, by the remote UE, path selection rules to select a path for traffic forwarding based at least on the traffic type or requirement, the link information, and the side information.

2. The method of claim 1, wherein the selected path is in a granularity of per radio bearer, per QoS flow, per logical channel (LCH), or per logical channel group (LCG).

3. The method of claim 1, wherein a path selection rule is that packets belonging to one of a signal radio bearer (SRB), a PDCP control PDU, and URLLC traffic are forwarded to the primary path.

4. The method of claim 1, wherein the primary path or the direct path is selected if the data volume in a PDCP buffer is below a data volume threshold.

5. The method of claim 1, wherein the UE sends a path indication of the selected path to the relay UE or the base station, and wherein the path indication is carried by a radio resource control (RRC) signaling message or a MAC control element (CE).

6. The method of claim 5, wherein the path indication comprises a path ID of the selected path.

7. A remote User Equipment (UE) comprising:
   a control circuit that identifies a traffic type or requirement of arriving traffic, wherein the remote UE is configured with multipath comprising a direct path to a base station and an indirect path to the base station via a relay UE, and wherein a primary path is selected from the direct path and the indirect path;
   a receiver that obtains link information of the direct path and side information of the indirect path, wherein the side information comprises metrics of sidelink (SL) or metrics of WiFi between the remote UE and the relay UE, and wherein the metrics of sidelink comprises one of a SL reference signal received power (RSRP), SL signal to interference and noise ratio (SINR), SL channel busy ratio (CBR), and a transmission latency; and
   a path selection circuit that applies path selection rules to select a path for traffic forwarding based at least on the traffic type or requirement, the link information, and the side information.

8. The UE of claim 7, wherein the selected path is in a granularity of per radio bearer, per QoS flow, per logical channel (LCH), or per logical channel group (LCG).

9. The UE of claim 7, wherein a path selection rule is that packets belonging to one of a signal radio bearer (SRB), a PDCP control PDU, and URLLC traffic are forwarded to the primary path.

10. The UE of claim 7, wherein the primary path or the direct path is selected if the data volume in a PDCP buffer is below a data volume threshold.

11. The UE of claim 7, further comprising:
    a transmitter that sends a path indication of the selected path to the relay UE or the base station, wherein the path indication is carried by a radio resource control (RRC) signaling message or a MAC control element (CE).

12. The UE of claim 11, wherein the path indication comprises a path ID of the selected path.

13. A method comprising:

receiving uplink information and side information from a remote UE or from a relay UE by a base station, wherein the remote UE is configured with multipath comprising a direct path to the base station and an indirect path to the base station via a relay UE, and wherein a primary path is selected from the direct path and the indirect path, wherein the side information comprises metrics of sidelink (SL) or metrics of WiFi between the remote UE and the relay UE, and wherein the metrics of sidelink comprises one of a SL reference signal received power (RSRP), SL signal to interference and noise ratio (SINR), SL channel busy ratio (CBR), and a transmission latency;

performing, by the base station, dynamic primary path change based on the uplink information and the side information, wherein the base station selects a path for the remote UE for transmitting uplink traffic; and sending, by the base station, a path indication of the selected path to the remote UE, wherein the path indication is carried by an RRC message, a DL MAC control element, or a PHY layer control signaling.

14. The method of claim 13, further comprising:

requesting the remote UE or the relay UE to send the side information to the network entity.

\* \* \* \* \*